United States Patent
Lee et al.

(10) Patent No.: US 7,314,206 B2
(45) Date of Patent: Jan. 1, 2008

(54) SUPPORTING APPARATUS FOR WASHING MACHINE

(75) Inventors: Tae-Hee Lee, Bucheon (KR);
Moon-Hee Hong, Seoul (KR);
Hyun-Seok Seo, Incheon (KR);
Sang-Wook Hong, Seoul (KR); Byung Keol Choi, Incheon (KR); Byung-Soo Je, Seoul (KR); Si-Moon Jeon, Seoul (KR)

(73) Assignee: LG Electronics Inc., Seoul (KR)

( * ) Notice: Subject to any disclaimer, the term of this patent is extended or adjusted under 35 U.S.C. 154(b) by 129 days.

(21) Appl. No.: 10/990,553

(22) Filed: Nov. 18, 2004

(65) Prior Publication Data
US 2005/0116134 A1    Jun. 2, 2005

(30) Foreign Application Priority Data

| Nov. 27, 2003 | (KR) | 10-2003-0085266 |
| Nov. 27, 2003 | (KR) | 10-2003-0085267 |
| Nov. 27, 2003 | (KR) | 10-2003-0085268 |
| Dec. 31, 2003 | (KR) | 10-2003-0102278 |
| Apr. 6, 2004 | (KR) | 10-2004-0023490 |

(51) Int. Cl.
*F16M 5/00* (2006.01)

(52) U.S. Cl. .............. 248/655; 248/188.3; 68/3 R

(58) Field of Classification Search ............ 248/188, 248/188.1, 188.2, 188.3, 650, 188.8, 565, 248/569, 677, 649, 655, 440.1; 182/153, 182/155, 168, 225, 15, 200, 226; 108/44; 68/3 R See application file for complete search history.

(56) References Cited

U.S. PATENT DOCUMENTS

| 1,866,274 | A | * | 7/1932 | Stoller | 248/562 |
| 2,335,834 | A | * | 11/1943 | Wood | 248/565 |
| 2,683,576 | A | * | 7/1954 | Miller | 248/562 |
| 2,892,482 | A | * | 6/1959 | Beoletto | 248/565 |
| 3,191,895 | A | * | 6/1965 | Whelan | 248/570 |
| 4,798,359 | A | * | 1/1989 | Ball | 248/188.3 |
| 4,949,923 | A | * | 8/1990 | Daily | 248/188.3 |
| 5,344,116 | A | * | 9/1994 | Winkler | 248/677 |
| 5,967,472 | A | * | 10/1999 | Wilhelmstatter et al. | 248/188.4 |
| 2002/0139909 | A1 | * | 10/2002 | Oyama et al. | 248/188.8 |

FOREIGN PATENT DOCUMENTS

| JP | 5084387 | 6/1993 |
| JP | 3287585 | 3/2002 |
| KR | 91-11653 | 7/1991 |
| KR | 100268282 | 7/2000 |

OTHER PUBLICATIONS

English Language abstract of JP-05-084387.
English Language abstract of JP-3287585.
English Language Abstract of KOREAN 10-0268282.

* cited by examiner

*Primary Examiner*—Korie Chan
(74) *Attorney, Agent, or Firm*—Greenblum & Bernstein, P.L.C.

(57) ABSTRACT

A supporting apparatus for a washing machine including a plurality of supporting legs mounted on a base fixed to a lower portion of a washing machine main body to move in the vertical direction, a foot mounted on the lower end of the supporting leg to contact the support surface, and a spring provided between the base and the foot, for applying an elastic force to the foot. The supporting apparatus for the washing machine automatically controls the level of the washing machine by the elastic force of the spring, and reduces noises and vibrations during the operation of the washing machine.

3 Claims, 14 Drawing Sheets

SUPPORTING APPARATUS FOR WASHING MACHINE

CROSS-REFERENCE TO RELATED APPLICATION

The present disclosure relates to subject matter contained in priority Korean Application Nos. 085266/2003, filed Nov. 27, 2003; 085267/2003, filed Nov. 27, 2003; 085268/2003, filed Nov. 27, 2003; 102278/2003, filed Dec. 31, 2003; and 023490/2004, filed Apr. 6, 2004; which are herein expressly incorporated by reference in their entireties.

BACKGROUND OF THE INVENTION

1. Field of the Invention

The present invention relates to a supporting apparatus for a washing machine, and more particularly, to a supporting apparatus for a washing machine which can simplify installation of the washing machine and reduce noises and vibrations, by enabling all feet to contact the support surface without manual adjustment.

2. Description of the Background Art

FIG. 1 is a perspective view illustrating a known washing machine.

In general, the washing machine includes a cabinet 156 having a door 152 for opening and closing an inlet/outlet 150 for clothes at its front portion, a tub 160 supported in the cabinet 156 by a plurality of dampers 158 and for storing washing water, a drum 162 rotatably disposed in the tub 160, for washing and drying the clothes, a driving motor 164 disposed at the rear portion of the tub 160 and coupled to the drum 162 through a drive shaft for rotating the drum 162, and supporting apparatuses 170 installed at the four corners of the cabinet 156 for supporting the washing machine.

FIG. 2 is a cross-sectional view illustrating the conventional supporting apparatus.

The conventional supporting apparatus 170 includes a mounting bracket 172 fixed to the bottom surface of the cabinet 156 and having a female screw unit 174, a supporting leg 176 having a male screw unit 178 on its outer circumferential surface to be screw-coupled to the mounting bracket 172, and being screwed or unscrewed to move in the up or down direction to control the height, and a foot 180 formed at the lower end of the supporting leg 176 to contact a support surface.

When the user puts the washing machine on the bottom or support surface of the installation space and rotates the supporting legs 176, the male screw units 178 of the supporting legs 176 linearly move along the female screw units 174 of the mounting brackets 172 in the up or down direction, to control the level of the washing machine.

However, when the bottom or support surface on which the washing machine is installed is uneven, the user adjusts the balance of the washing machine by controlling the height of each supporting apparatus by screwing or unscrewing the supporting legs 176. It is thus difficult to adjust the balance of the washing machine. Especially when the installation space of the washing machine is so narrow that the user cannot reach the supporting apparatuses 170, the user cannot easily control the height of the supporting apparatuses 170.

In addition, when the user does not precisely control the height of the supporting apparatuses 170, if any of the feet do not contact the bottom or support surface, the foot hits the support surface during the operation of the washing machine, to cause shocks, vibrations and noises.

SUMMARY OF THE INVENTION

Therefore, an object of the present invention is to provide a supporting apparatus for a washing machine which can simplify installation of the washing machine without requiring an operation for controlling the height in the installation process, because the level of the washing machine is automatically controlled when the washing machine is put on the bottom or support surface.

Another object of the present invention is to provide a supporting apparatus for a washing machine which can reduce noises and vibrations during the operation of the washing machine, by enabling all feet to contact the support surface even if the support surface is uneven.

Yet another object of the present invention is to provide a supporting apparatus for a washing machine which can reduce vibrations and noises during the operation of the washing machine by using a damping apparatus.

To achieve these and other advantages and in accordance with the purpose of the present invention, as embodied and broadly described herein, there is provided a supporting apparatus for a washing machine, including: a plurality of supporting legs mounted on a base fixed to a lower portion of a washing machine main body to move in the up and down directions; a foot mounted on the lower end of the supporting leg to contact the support surface; and a spring provided between the base and the foot, for applying an elastic force to the foot.

A nut for preventing the supporting leg from being separated from a through hole is fastened to the upper portion of the supporting leg.

A joint unit for coupling the foot to the supporting leg to perform a pivot motion is provided between the foot and the supporting leg, and the joint unit includes: a ball formed at the end of the supporting leg; a supporting member having a hemispherical recess so that the ball can be inserted thereinto to perform a rolling motion, the foot mounted on the member; and a cover mounted on the upper portion of the supporting member, for preventing the ball from being separated from the supporting member.

A damping member for performing a damping operation is provided between the spring and the base, and a guide member for guiding the spring to be compressed and extended in the up and down direction is mounted on the bottom surface of the base.

According to one aspect of the present invention, a supporting apparatus for a washing machine includes: a plurality of supporting legs mounted on a base fixed to a lower portion of a washing machine main body to move in the up and down direction; a foot mounted on the lower end of the supporting leg to contact the support surface; a spring provided between the base and the foot for applying an elastic force to the foot; and a damping unit mounted on the top surface of the spring and the top surface of the base, for reducing vibrations during the operation of the washing machine by restricting resonance of the spring.

The damping unit includes: a housing fastened to the top surface of the base, having an inside space, and having a through hole through which the supporting leg passes at its upper portion; a first sheet member disposed in the housing and fastened to the supporting leg to move with the supporting leg in the up and down direction for supporting the lower end of the spring; a second sheet member disposed at the upper inside portion of the housing for supporting the upper end of the spring; and a friction member fixed to the outer circumferential surface of the first sheet member, and rubbing against the inner circumferential surface of the housing.

According to another aspect of the present invention, a supporting apparatus for a washing machine includes: a plurality of supporting legs mounted on a base fixed to a lower portion of a washing machine main body to move in the up and down direction; a foot mounted on the lower end of the supporting leg to contact the support surface; a spring provided between the base and the foot, for applying an elastic force to the foot; and a locking unit mounted on one side of the base, for locking up and down movement of the supporting leg during the operation of the washing machine.

The locking unit includes: a push rod provided to linearly move in the right angle direction of the supporting leg, and having its end closely adhered to the side of the supporting leg in order to lock length direction movement of the supporting leg; and an actuator on which the push rod is mounted to linearly move the actuator moving the push rod when receiving power.

A further aspect of the present invention provides a supporting apparatus for a washing machine, including a housing fixed to a lower portion of a body and having a receiving space of which one side is open therein; a spring mounted in the receiving space to be expanded and contracted; a first sheet member to support a lower end of the spring; a friction member coupled to the first sheet member, to prevent horizontal motion of the first sheet member and to perform a damping operation by being relatively moved against the housing; and a leg fixed to the first sheet member, to support the body with a spacing distance from a bottom surface. In a further aspect of the present invention, a supporting apparatus for a washing machine includes a first sheet member arranged in a base of a body; a friction member coupled to an outer surface of the first sheet member; a leg coupled to the first sheet member so that an upper end thereof passes through the base from the outside; a spring supported by the first sheet member and expanded and contracted in a longitudinal direction of the leg; and a housing having a receiving space of which one side is open therein, and fixed to the base, to insert the spring and the first sheet member into the receiving space.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

A supporting apparatus for a washing machine in accordance with the preferred embodiments of the present invention will now be described in detail with reference to the accompanying drawings.

Figure 1:
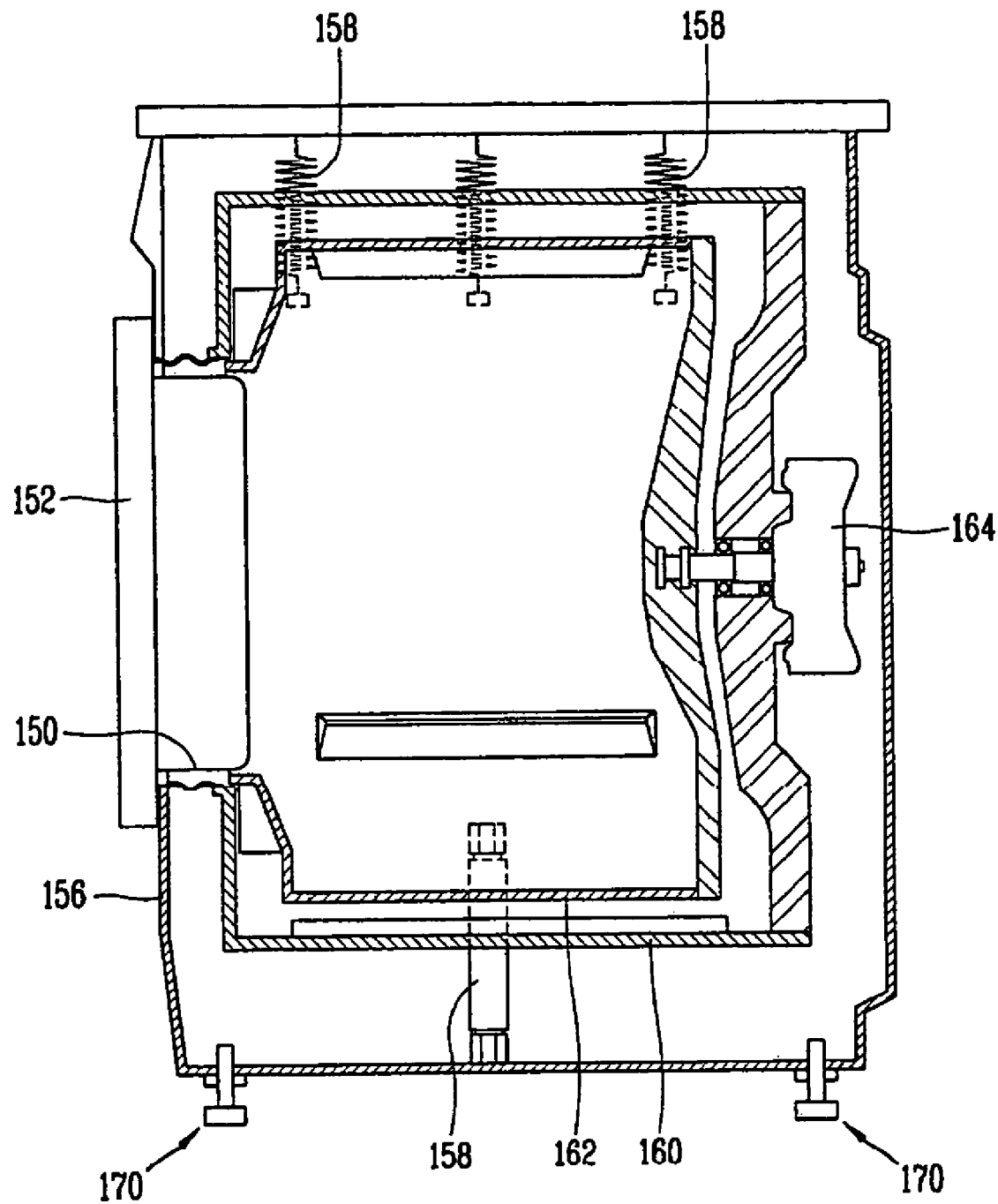
FIG. 1 is a cross-sectional view illustrating a conventional washing machine.
Figure 2:
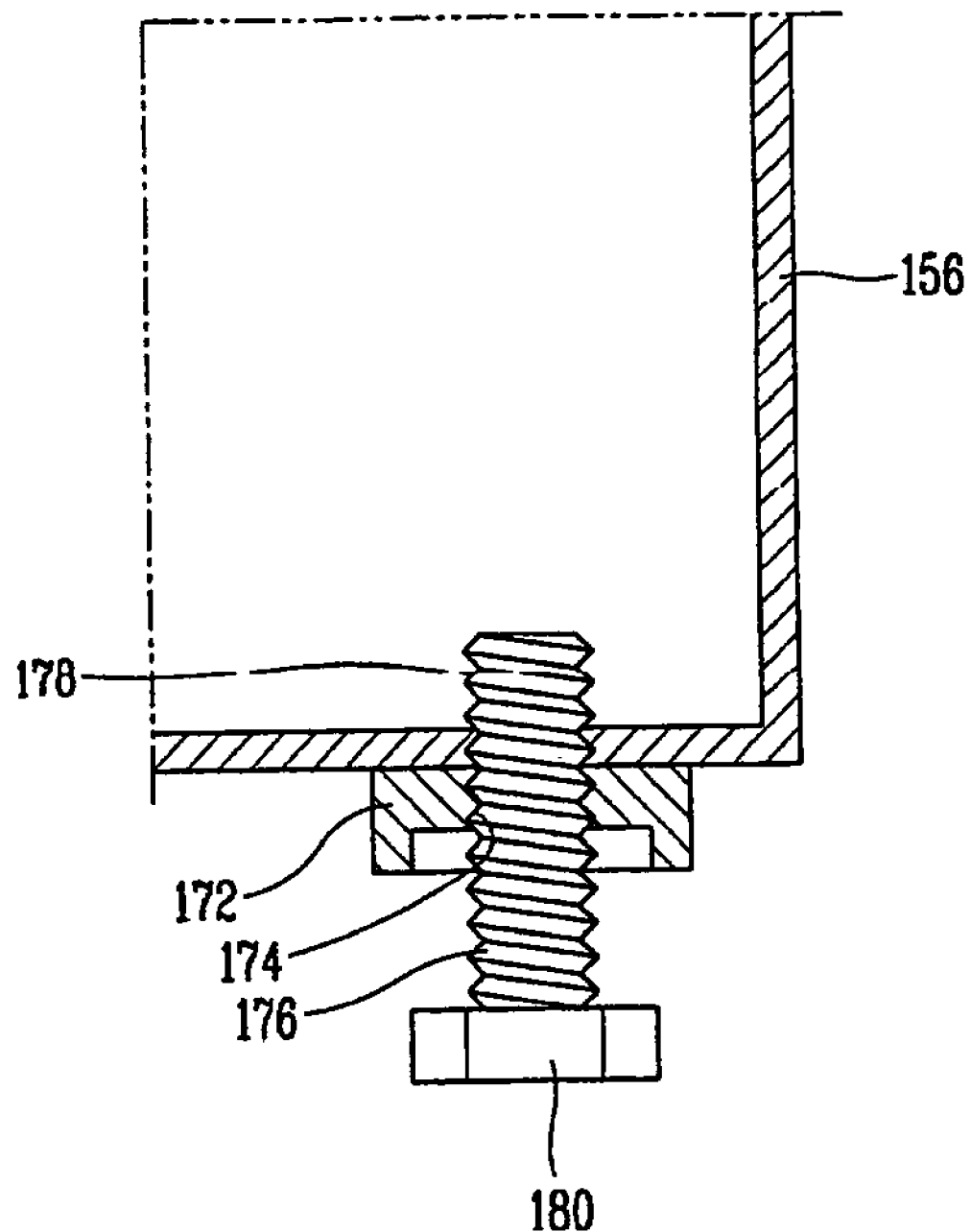
FIG. 2 is a cross-sectional view illustrating a conventional supporting apparatus for a washing machine.
Figure 3:
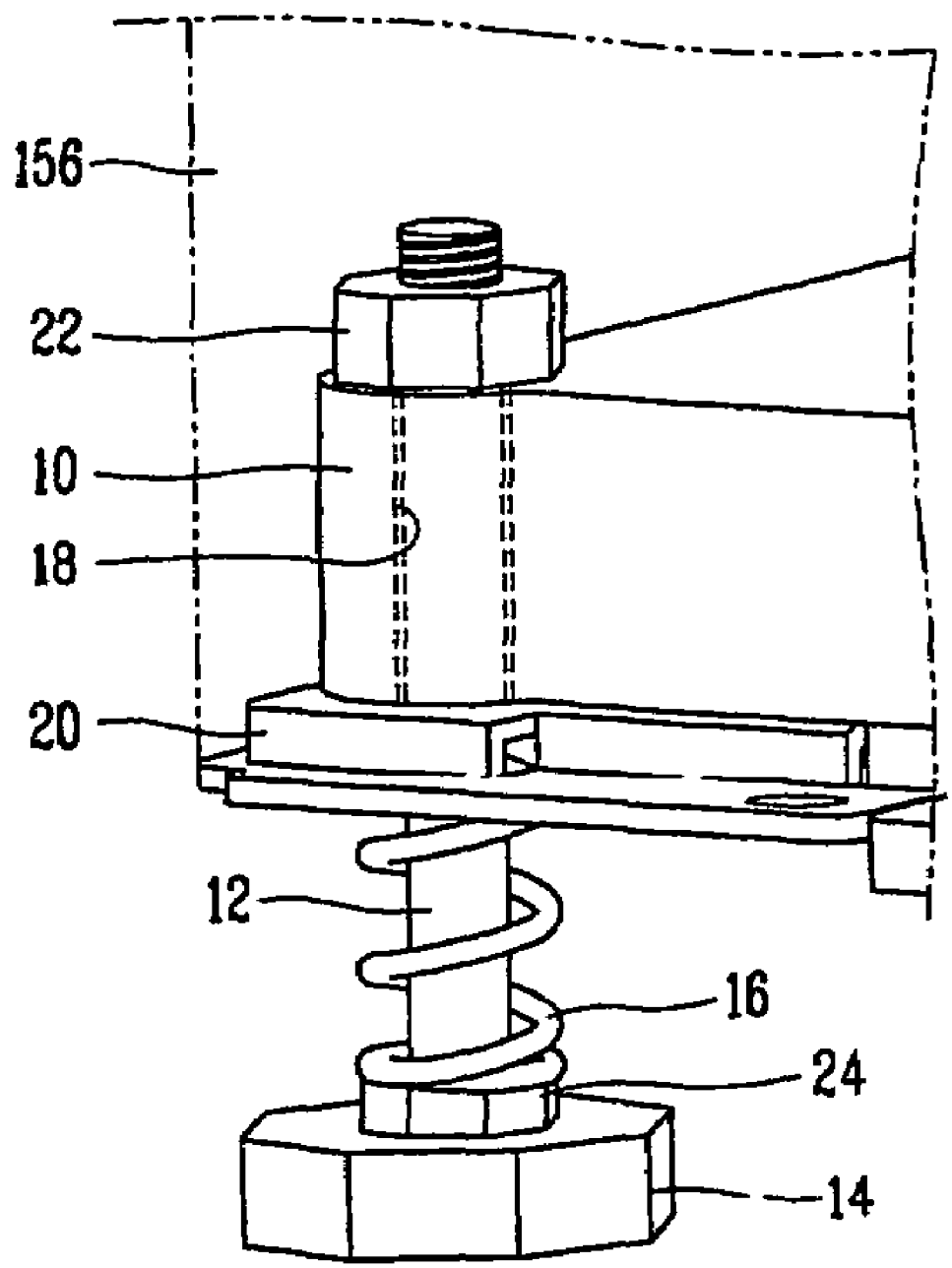
FIG. 3 is a perspective view illustrating a supporting apparatus for a washing machine in accordance with a first embodiment of the present invention.
Figure 4:
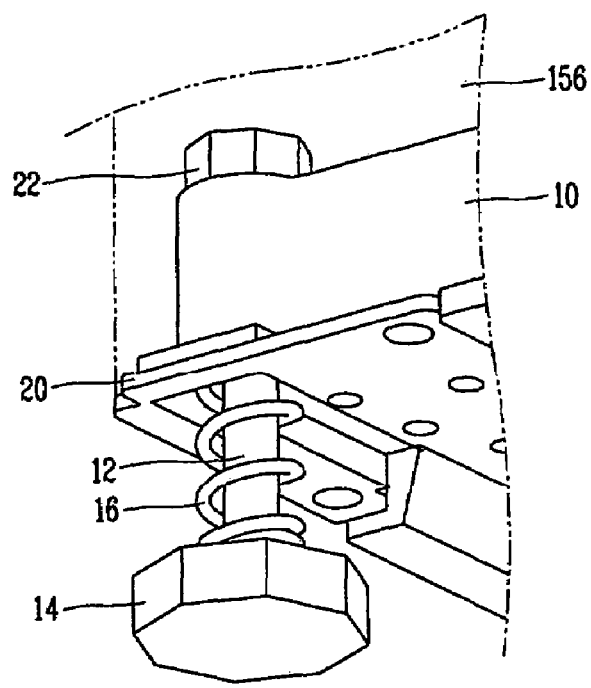
FIG. 4 is a perspective view illustrating the supporting apparatus for a washing machine in accordance with the first embodiment.
Figure 5:
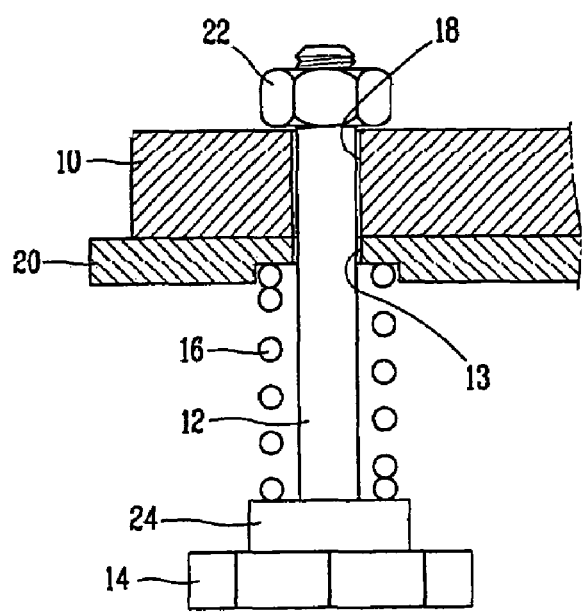
FIG. 5 is a cross-sectional view illustrating the supporting apparatus for the washing machine in accordance with the first embodiment of the present invention.

FIGS. 3 and 4 are perspective views illustrating a supporting apparatus for a washing machine in accordance with a first embodiment of the present invention; and FIG. 5 is a cross-sectional view illustrating the supporting apparatus for the washing machine in accordance with the first embodiment of the present invention.

In accordance with the first embodiment of the present invention, the supporting apparatus includes a base 10 fixed to a lower portion of a cabinet 156 of the washing machine, and having vertical through holes 18 at its four corners, supporting legs 12 inserted into the through holes 18 of the base 10 to move linearly in the vertical or up/down direction, a foot 14 mounted on the lower end of the supporting leg 12 to contact the bottom or support surface or floor of an installation area, and a spring 16 provided between the base 10 and the foot 14 for applying an elastic force to the foot 14.

A mounting bracket 20 having a through hole 13 through which the supporting leg 12 passes, and supporting the upper end of the spring 16 is provided at the lower portion of the base 10. Preferably, the mounting bracket 20 may be constructed of any suitable material having sufficient rigidity to support the upper end of the spring 16, such as, for example, metal.

The supporting leg 12 is inserted into the through hole 18 to move in the vertical direction, not the right/left or horizontal direction. The supporting leg 12 is sufficiently long to project through both the upper portion of the base 10 and the lower portion of the mounting bracket 20. A nut 22 for preventing separation is fastened to the upper portion of the supporting leg 12 to prevent the supporting leg 12 from being separated from the base 10.

The foot 14 is formed in a flat planar shape, and preferably is constructed of a material such as, for example, rubber that will not slide on the support surface. A planar or sheet member 24 for fixing the supporting leg 12 and supporting the lower end of the spring 16 is fixed to the top surface of the foot 14.

The spring 14 may take any form and in present invention, preferably is a coil spring having its first end supported by the lower end of the mounting bracket 20 and its second end supported by the sheet member 24 fixed to the foot 14, and applying the elastic force to the foot 14.

The operation of the supporting apparatus for the washing machine in accordance with the first embodiment of the present invention will now be explained.

When the user puts the washing machine in the installation space, the washing machine is supported on the support surface by the supporting apparatuses mounted on the four corners of the base 10. Even if the support surface is uneven, the supporting apparatuses can maintain the balance of the washing machine without special operations or adjustment.

In detail, when the user puts the washing machine in the installation space, the feet 14 contact the support surface, and the springs 16 are compressed by the load of the washing machine to control the length of the supporting legs 12, so that the washing machine will be balanced. If the support surface is uneven, the supporting legs 12 move in the vertical direction to maintain the balance of the washing machine, and the feet 14 continuously contact the uneven support surface by the elastic force of the springs 16.

Figure 6:
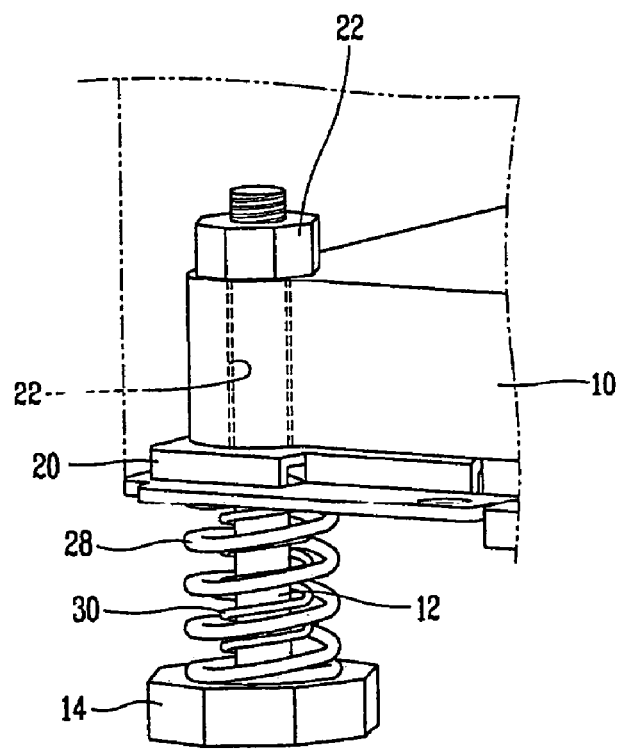
FIG. 6 is a perspective view illustrating a supporting apparatus for a washing machine in accordance with a second embodiment of the present invention.
Figure 7:
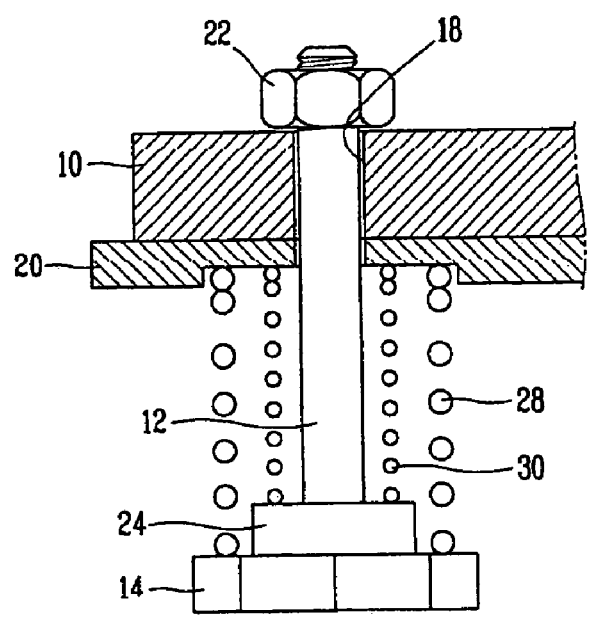
FIG. 7 is a cross-sectional view illustrating the supporting apparatus for the washing machine in accordance with the second embodiment of the present invention.

FIG. 6 is a perspective view illustrating a supporting apparatus for a washing machine in accordance with a second embodiment of the present invention, and FIG. 7 is a cross-sectional view illustrating the supporting apparatus for the washing machine in accordance with the second embodiment of the present invention.

In accordance with the second embodiment of the present invention, the supporting apparatus includes, at each corner of the base 10, a supporting leg 12 inserted into a through hole 18 of the base 10 to move in the vertical direction, a foot 14 mounted on the lower end of the supporting leg 12 to contact the support surface, and two springs 28 and 30 provided between a mounting bracket 20 mounted on the bottom surface of the base 10 and the foot 14. The springs 28, 30 may have different elastic force constants.

The two springs 28 and 30 consist of a first spring 28 having a relatively large elastic force, and a second spring 30 having a smaller elastic force than the first spring 28.

Preferably, the first spring 28 is a coil spring provided between the mounting bracket 20 and the top surface of the foot 14, and the second spring 30 is a coil spring provided inside the first spring 28, and provided between the mounting bracket 20 and a sheet or planar member 24 fixed on the top surface of the foot 14 and coupled to the supporting leg 12.

In this embodiment, the second spring 30 is shorter than the first spring 28 in the non-load state, and has a smaller spring constant than the first spring 28.

The first spring 28 elastically supports the load of the washing machine, and the second spring 30 applies the elastic force to the foot 14 to contact the bottom surface on which the washing machine is installed if it is uneven.

In addition, the washing machine supported by the first spring 28 and the second spring 30 having different spring constants efficiently absorbs vibrations during the operation. That is, because the first spring 28 and the second spring 30 have different lengths in the non-load state and different spring constants, the first spring 28 and the second spring 30 receive the load of the washing machine in the operation of the washing machine, thereby changing the frequency band in which a peak value of vibrations is generated during the operation.

In accordance with the second embodiment of the present invention, even if the support surface of the installation space of the washing machine is uneven, all the feet 14 contact the support surface by the elastic force of the second springs 30, and the load of the washing machine is elastically supported by the elastic force of the first springs 28. As a result, the balance of the washing machine can be maintained.

Moreover, the first spring 28 and the second spring 30 which have different spring constants and different lengths in the non-load state change the frequency band in which the peak value of vibrations is generated during the operation of the washing machine, to prevent vibrations and noises.

Figure 8:
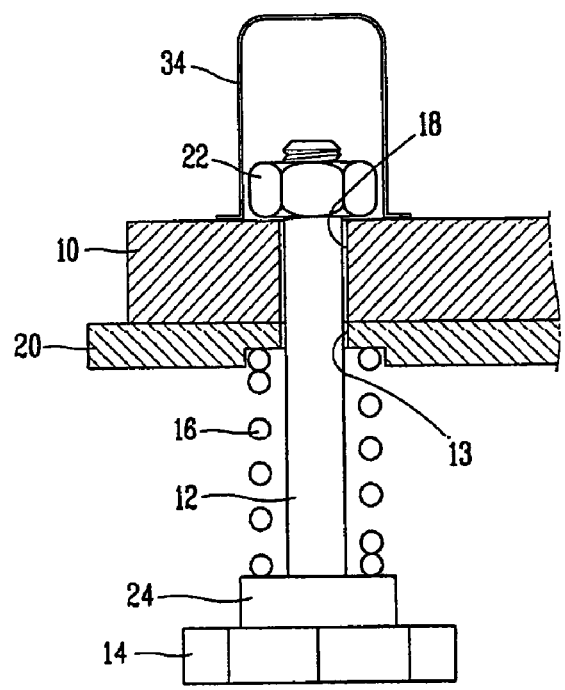
FIG. 8 is a cross-sectional view illustrating a supporting apparatus for a washing machine in accordance with a third embodiment of the present invention.

FIG. 8 is a cross-sectional view illustrating a supporting apparatus for a washing machine in accordance with a third embodiment of the present invention.

The supporting apparatus of the third embodiment is identical in structure to the supporting apparatus of the first embodiment except that a cap 34 for preventing foreign substances and dust from entering the through hole 18 into which the supporting leg 12 is inserted to move in the vertical direction, is mounted on the upper portion of the supporting apparatus.

In accordance with the third embodiment of the present invention, the cap 34 is put on the nut 22 for preventing separation from the supporting leg 12 is fastened, and fixed to the top surface of the base 10. The cap 34 is so configured and tall enough so that the supporting leg 12 can sufficiently move upwardly inside the cap 34.

Figure 9:
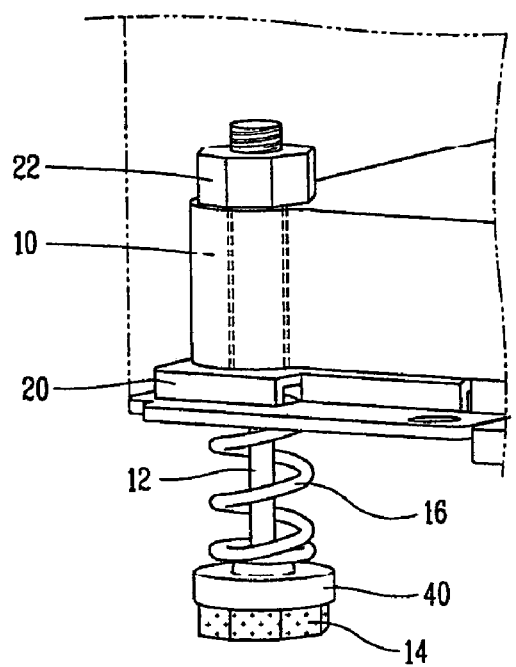
FIG. 9 is a perspective view illustrating a supporting apparatus for a washing machine in accordance with a fourth embodiment of the present invention.
Figure 10:
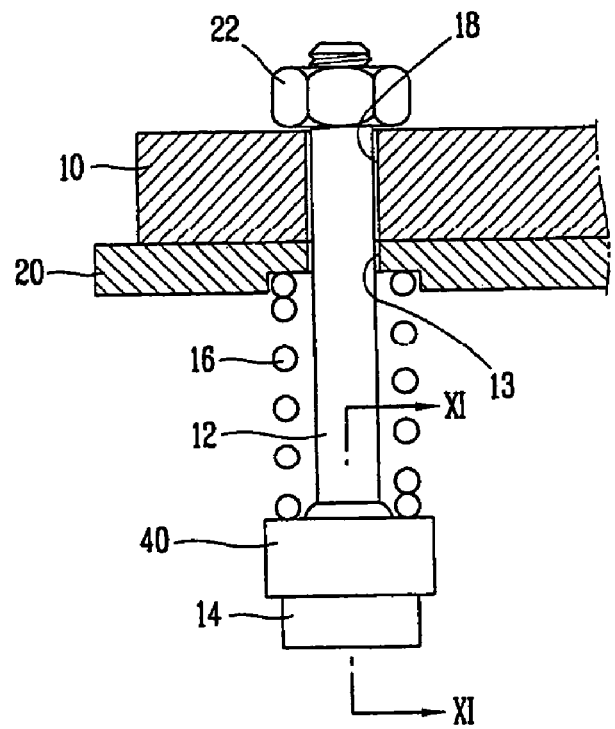
FIG. 10 is a cross-sectional view illustrating the supporting apparatus for the washing machine in accordance with the fourth embodiment of the present invention.
Figure 11:
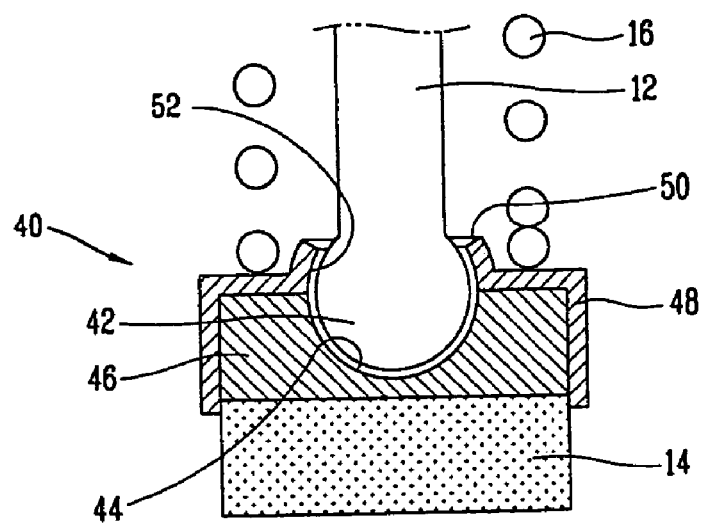
FIG. 11 is a cross-sectional view taken along line XI-XI of FIG. 10.
Figure 12:
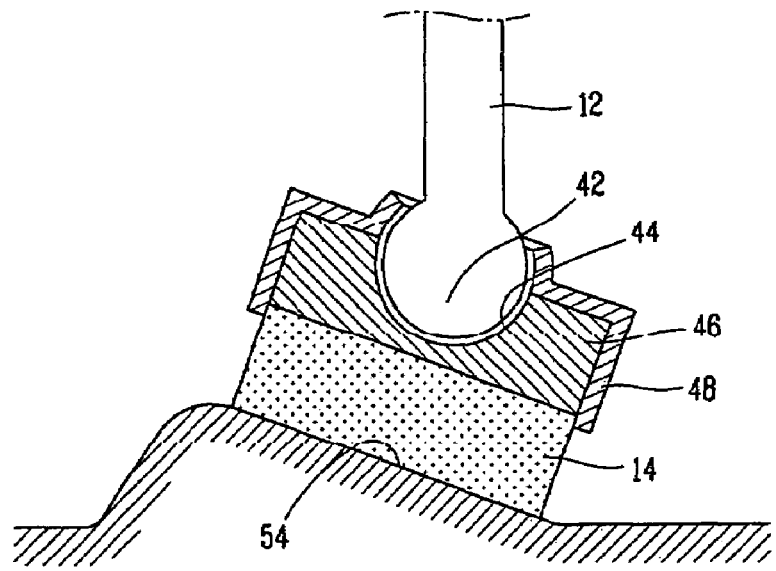
FIG. 12 is a cross-sectional view illustrating the supporting apparatus for the washing machine in accordance with the fourth embodiment of the present invention, showing the supporting apparatus in operation.

FIG. 9 is a perspective view illustrating a supporting apparatus for a washing machine in accordance with a fourth embodiment of the present invention, FIG. 10 is a cross-sectional view illustrating the supporting apparatus for the washing machine in accordance with the fourth embodiment of the present invention, FIG. 11 is a cross-sectional view taken along line XI-XI of FIG. 10, and FIG. 12 is view illustrating the supporting apparatus for the washing machine in accordance with the fourth embodiment of the present invention.

In accordance with the fourth embodiment of the present invention, the supporting apparatus includes a base 10 having vertical through holes 18 at its four corners, supporting legs 12 inserted into the through holes 18 of the base 10 to move linearly in the vertical direction, a foot 14 rotatably mounted on the lower end of the supporting leg 12 to contact the support surface, a spring 16 provided between the base 10 and the foot 14, for applying an elastic force to the foot 14, and a joint unit or universal joint 40 formed between the foot 14 and the supporting leg 12, for coupling the foot 14 to the supporting leg 12 to perform a pivot motion.

Referring to FIG. 11, the joint unit 40 consists of a ball 42 formed at the end of the supporting leg 12, a supporting member 46 having a hemispherical recess 44 so that the ball 42 can be inserted thereinto to perform a rolling motion, the foot 14 being mounted on the member 46, and a cover 48 mounted on the upper portion of the supporting member 46, for covering the upper end of the ball 42 to prevent the ball 42 from being separated from the supporting member 46.

The hemispherical recess 44 is formed at the top center of the supporting member 46, and the rubber foot 14 is fixed to the bottom surface thereof.

The cover 48 is coupled to the upper portion of the supporting member 46, having, at its center, a through hole 50 through which the supporting leg 12 passes and a hemispherical recess 52 surrounding the ball 42 to perform the rolling motion.

The operation of the supporting apparatus for the washing machine in accordance with the fourth embodiment of the present invention will now be explained. When the support surface on which the washing machine is installed has an inclined surface 54, as shown in FIG. 12, the ball 42 formed on the supporting leg 12 performs the rolling motion in the hemispherical recess 44 of the supporting member 46, the supporting member 46 performs the rotary motion, and thus the whole bottom surface of the foot 14 contacts the inclined surface 54, to stably support the washing machine.

Figure 13:
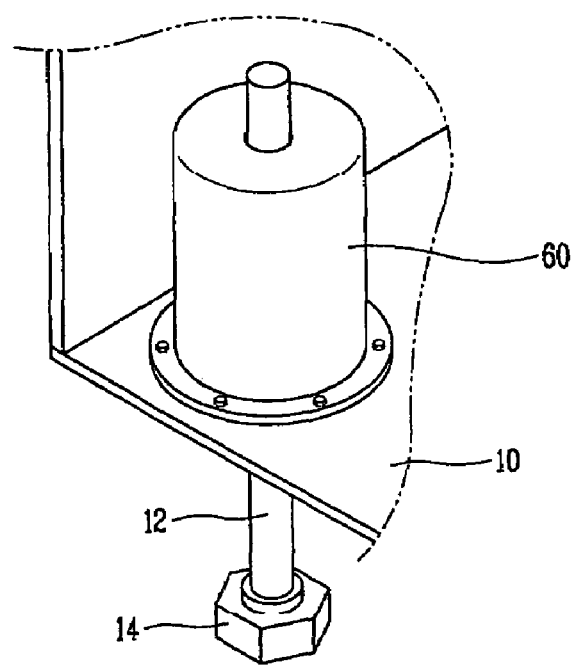
FIG. 13 is a perspective view illustrating a supporting apparatus for a washing machine in accordance with a fifth embodiment of the present invention.
Figure 14:
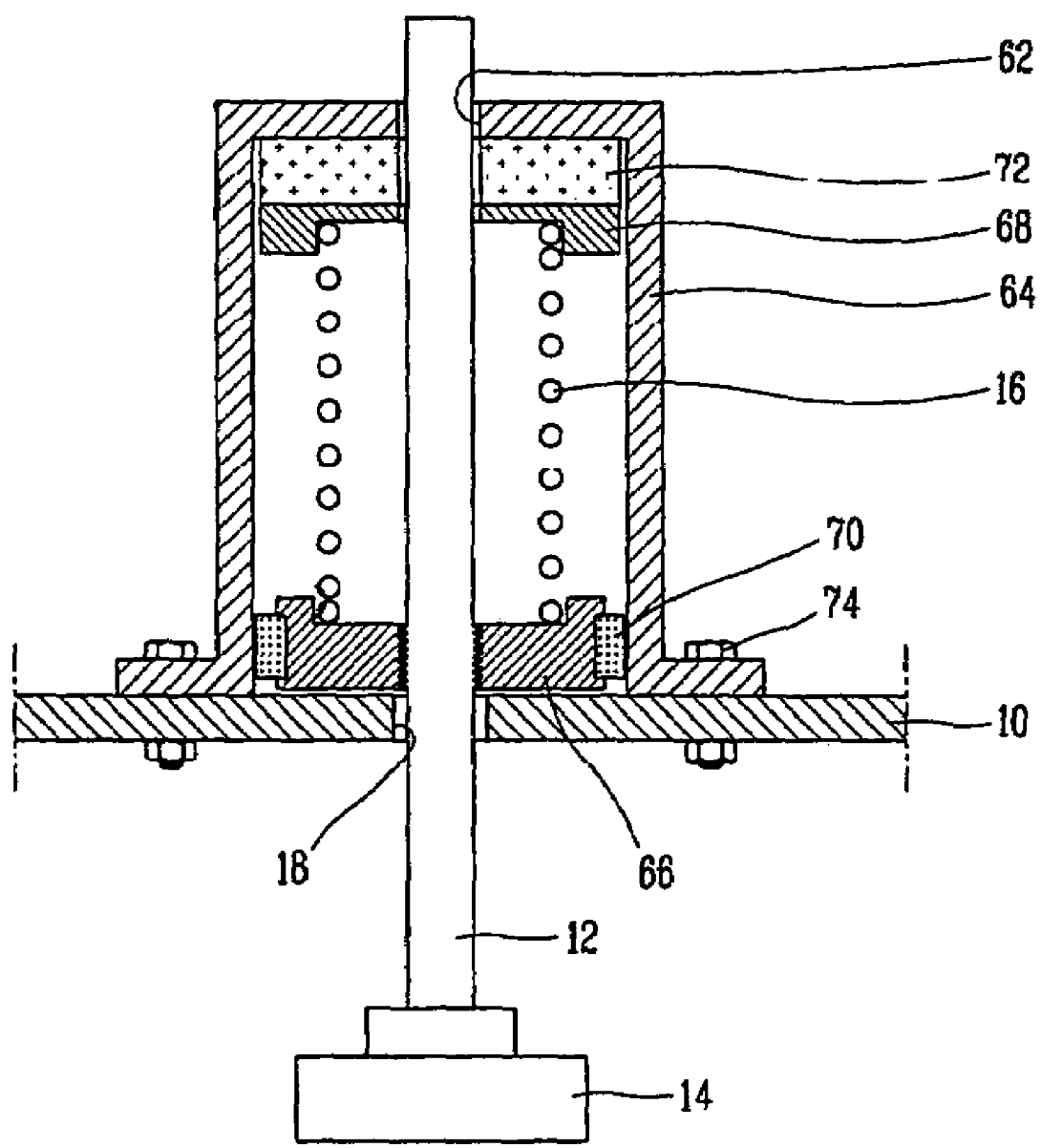
FIG. 14 is a cross-sectional view illustrating the supporting apparatus for the washing machine in accordance with the fifth embodiment of the present invention.

FIG. 13 is a perspective view illustrating a supporting apparatus for a washing machine in accordance with a fifth embodiment of the present invention, and FIG. 14 is a cross-sectional view illustrating the supporting apparatus for the washing machine in accordance with the fifth embodiment of the present invention.

In accordance with the fifth embodiment of the present invention, the supporting apparatus includes a supporting leg 12 inserted into a through hole 18 of a base 10 to move linearly in the vertical direction, a foot 14 mounted on the lower end of the supporting leg 12 to contact the support surface, a spring 16 for elastically supporting the foot 14, and a damping unit 60 mounted on the top surface of the base 10, for reducing vibrations during the operation of the washing machine by restricting resonance of the spring 16.

The damping unit 60 includes a housing 64 being fastened to the top surface of the base 10, having an inside space, and having a through hole 62 through which the upper portion of the supporting leg 12 passes, a first substantially planar sheet member 66 provided in the housing 64 and fastened to the supporting leg 12 to move with the supporting leg 12 in the vertical direction, for supporting the lower end of the spring 16, a second substantially planar sheet member 68 provided at the upper inside portion of the housing 64, for supporting the upper end of the spring 16, a friction member 70 fixed to the outer circumferential surface of the first sheet member 66, to rub against the inner circumferential surface of the housing 64, and a buffer member 72 provided between the top inner surface of the housing 64 and the second sheet member 68, for absorbing shock.

The housing 64 is formed in a cylindrical shape with an open lower portion. A flange is formed at the lower end of the housing 64, and fastened to the top surface of the base 10 by any suitable fastening device such as, for example, bolts 74. The first sheet member 66 is formed in a disk shape so that the lower end of the spring 16 may be supported thereon. The friction member 70 is fixedly inserted onto the outer circumferential surface of the first sheet member 66.

The buffer member 72 is provided on the upper inside surface of the housing 64, and may be constructed of any suitable material for absorbing shocks and vibrations, such as, for example, rubber.

The friction member 70 is fixed to the outer circumferential surface of the first sheet member 66, for rubbing against the inner circumferential surface of the housing 64 for damping. Preferably, the friction member 70 is constructed of a material having sufficient resistance to abrasion by friction.

The operation of the supporting apparatus for the washing machine in accordance with the fifth embodiment of the present invention will now be explained.

When the user puts the washing machine in the installation space, the washing machine is supported on the support surface by the supporting apparatuses mounted on the four corners of the base 10. If the support surface is uneven, the supporting legs 12 move in the vertical direction, all the feet 14 contact the support surface, and the balance of the washing machine is maintained by the elastic force of the springs 16.

In this state, when the washing machine is driven, the buffer member 72 mounted inside the housing 64 absorbs vibrations of the washing machine to prevent the vibrations from being applied to the support surface. In addition, the friction member 70 mounted on the outer circumferential surface of the first sheet member 66 supporting the spring 16 rubs against the inner circumferential surface of the housing 64 to restrict resonance of the spring 16 for damping, thereby reducing vibrations of the washing machine.

Figure 15:
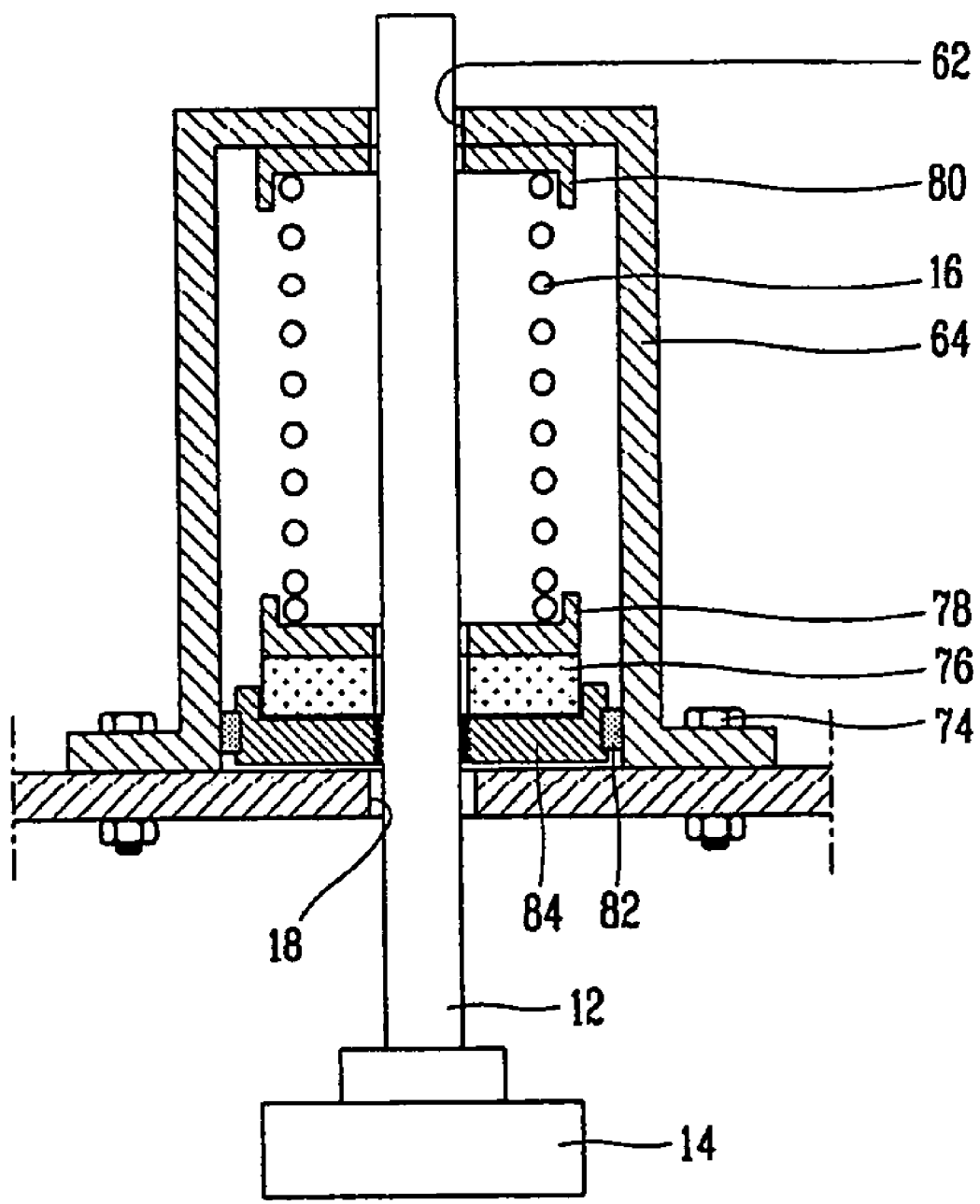
FIG. 15 is a cross-sectional view illustrating a supporting apparatus for a washing machine in accordance with a sixth embodiment of the present invention.

FIG. 15 is a cross-sectional view illustrating a supporting apparatus for a washing machine in accordance with a sixth embodiment of the present invention.

The supporting apparatus of the sixth embodiment is identical in structure to the supporting apparatus of the fifth embodiment except that a buffer member 76 is disposed at the lower portion of the housing 64.

In accordance with the sixth embodiment of the present invention, a damping unit includes a first substantially planar sheet member 78 provided at the lower inside portion of the housing 64, for supporting a lower end of a spring 16, a second substantially planar sheet member 80 provided at the upper inside portion of the housing 64, for supporting the upper end of the spring 16, a supporting member 84 fastened to a supporting leg 12 and having a friction member 82 rubbing against the inner circumferential surface of the housing 64 on its outer circumferential surface, and a buffer member 76 provided between the supporting member 84 and the first sheet member 78, for absorbing shocks and vibrations.

Figure 16:
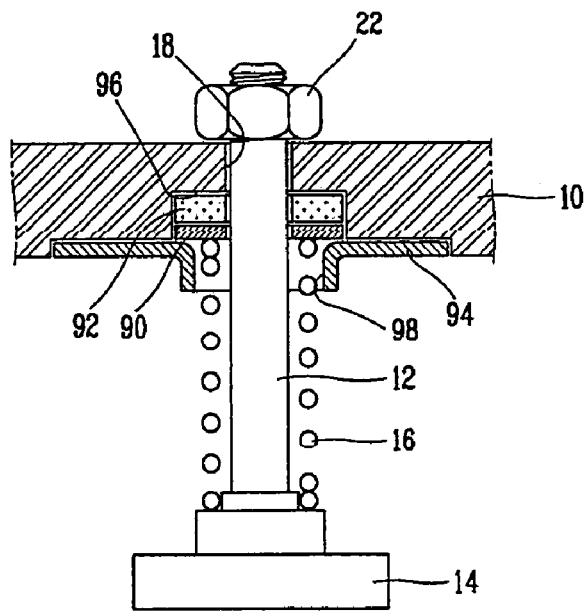
FIG. 16 is a cross-sectional view illustrating a supporting apparatus for a washing machine in accordance with a seventh embodiment of the present invention.

FIG. 16 is a cross-sectional view illustrating a supporting apparatus for a washing machine in accordance with a seventh embodiment of the present invention.

In accordance with the seventh embodiment of the present invention, the supporting apparatus includes a supporting leg 12 inserted into a through hole 18 of a base 10 to move linearly in the vertical direction, a foot 14 mounted on the lower end of the supporting leg 12 to contact the support surface on which the washing machine is installed, a spring 16 provided between the top surface of the foot 14 and a substantially planar sheet member 90 provided on the bottom surface of the base 10, for elastically supporting the foot 14, and a damping member 92 provided between the sheet member 90 and the bottom surface of the base 10, for performing a damping operation.

A housing groove or recess 96 for housing the damping member 92 and the sheet member 90 is formed on the bottom surface of the base 10. A guide member 94 for guiding the spring 16 to be compressed and extended in the vertical direction is mounted on the bottom surface of the base 10.

A through hole 98 through which the spring 16 passes is formed at the center of the guide member 94. The circumferential surface of the through hole 98 extends downwardly to guide the spring 16 to be compressed and extended in the vertical direction.

The sheet member 90 is formed in a disk shape having a central aperture so that the supporting leg 12 can pass through the open central aperture. The top surface of the sheet member 90 contacts the damping member 92, and the bottom surface of the sheet member 90 supports the upper end of the spring 16. Accordingly, an elastic force of the spring 16 can be evenly applied to the whole surface of the damping member 92.

The damping member 92 is constructed of a material that absorbs vibrations and shocks, for reducing vibrations during the operation of the washing machine.

In accordance with the seventh embodiment of the present invention, even if the support surface is uneven, all the feet 14 contact the support surface by the elastic force of the springs 16. Further, the damping operation of the damping member 92 serves to reduce vibrations and shocks during the operation of the washing machine.

Figure 17:
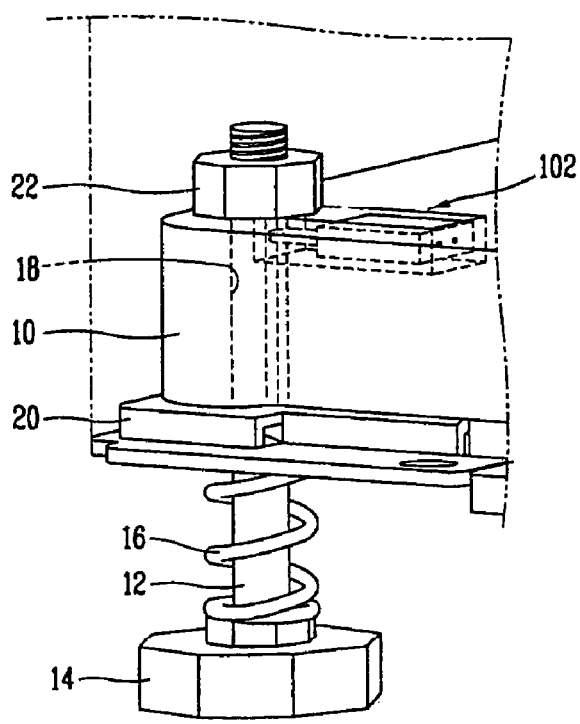
FIG. 17 is a perspective view illustrating a supporting apparatus for a washing machine in accordance with an eighth embodiment of the present invention.
Figure 18:
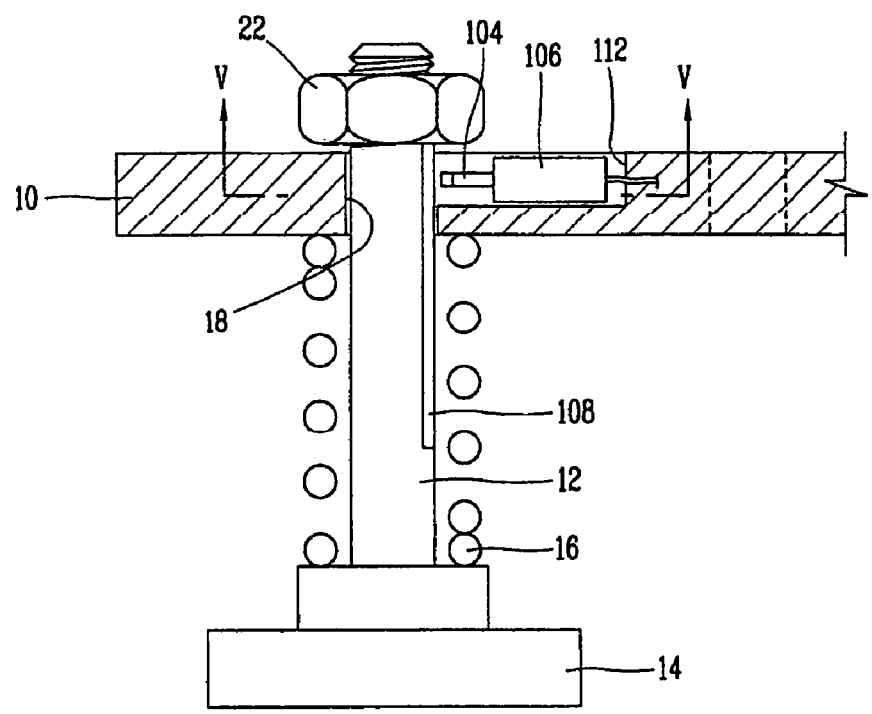
FIG. 18 is a cross-sectional view illustrating the supporting apparatus for the washing machine in accordance with the eighth embodiment of the present invention.
Figure 19:
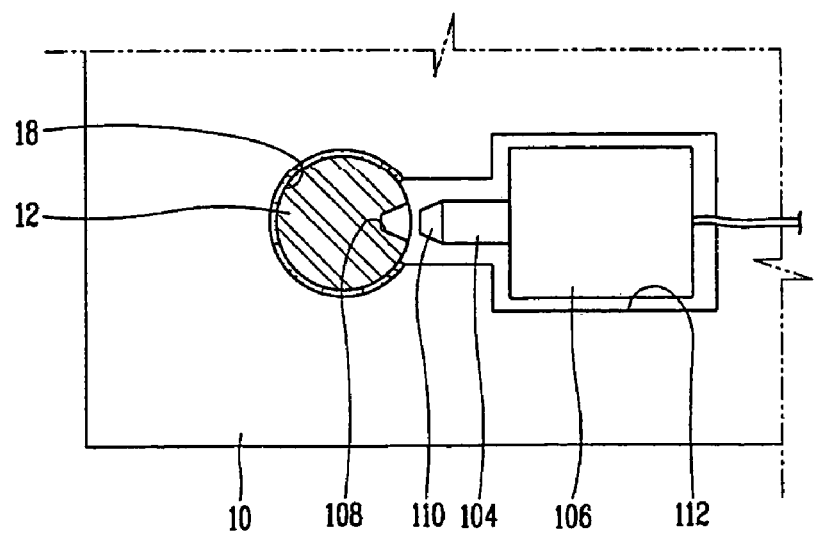
FIG. 19 is a cross-sectional view taken along line V-V of FIG. 18.
Figure 20:
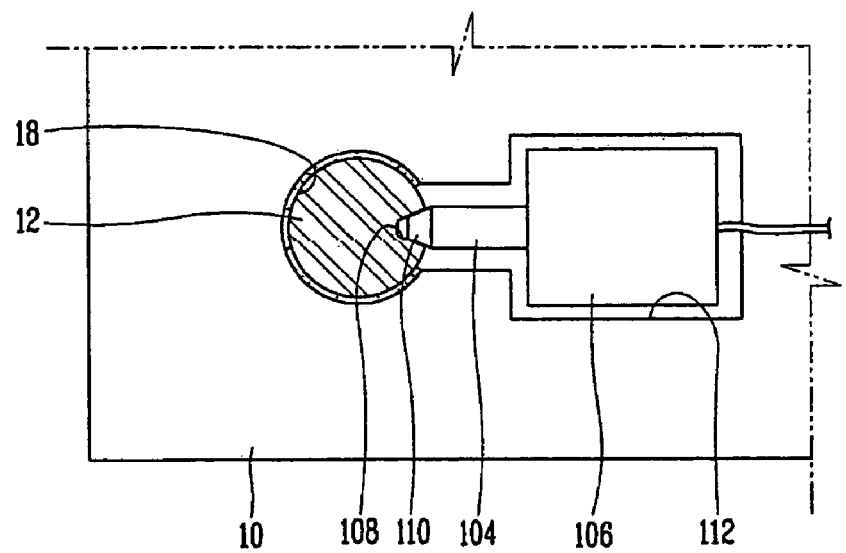
FIG. 20 is a cross-sectional view illustrating the supporting apparatus for the washing machine in accordance with the eighth embodiment of the present invention showing the supporting apparatus in operation.

FIG. 17 is a perspective view illustrating a supporting apparatus for a washing machine in accordance with an eighth embodiment of the present invention, FIG. 18 is a cross-sectional view illustrating the supporting apparatus for the washing machine in accordance with the eighth embodiment of the present invention, FIG. 19 is a cross-sectional view taken along line V-V of FIG. 18, and FIG. 20 is an operational state view illustrating the supporting apparatus for the washing machine in accordance with the eighth embodiment of the present invention.

In accordance with the eighth embodiment of the present invention, the supporting apparatus includes a supporting leg 12 inserted into a through hole 18 of a base 10 to linearly move in the up/down direction, a foot 14 mounted on the lower end of the supporting leg 12 to contact the support surface, a spring 16 provided between the base 10 and the foot 14, for applying an elastic force to the foot 14, and a locking unit 102 mounted on one side of the base 10, for locking vertical movement of the supporting leg 12.

The locking unit 102 includes a push rod 104 provided to move linearly in a direction perpendicular to the supporting leg 12, and having its end closely adjacent to the side of the supporting leg 12 in order to lock vertical movement of the supporting leg 12 along its length, and an actuator 106 on which the push rod 104 is mounted to move linearly, the push rod 104 when receiving power.

A mounting unit 112 on which the actuator 106 is mounted is formed on the top surface of the base 10.

A tapered groove or recess 108 is formed in the side of the supporting leg 12 in the length direction, and a tapered projection 110 to be inserted into the tapered groove 108 is formed at the end of the push rod 104, to increase the contact area between the push rod 104 and the supporting leg 12. Therefore, the locking operation of the supporting leg 12 is efficiently performed.

The actuator may be a suitable type such as, for example, a solenoid type actuator pushing the push rod when receiving power, or a thermo-actuator that thermally expands to push the push rod when receiving power.

The operation of the supporting apparatus for the washing machine in accordance with the eighth embodiment of the present invention will now be described.

When the user puts the washing machine in the installation space, if the support surface is uneven, each of the supporting legs 12 moves in the vertical direction to maintain the balance of the washing machine, and the feet 14 continuously contact the uneven support surface by the elastic force of the springs 16.

Here, when the washing machine is driven, power is applied to the actuator 106, and thus the push rod 104 linearly moves to pressurize the side of the supporting leg 12. That is, the tapered projection 110 of the push rod 104 is inserted into the tapered groove 108 of the supporting leg 12, thereby locking movement of the supporting leg 12. As a result, resonance of the spring 16 is restricted not to cause vibrations.

Figure 21:
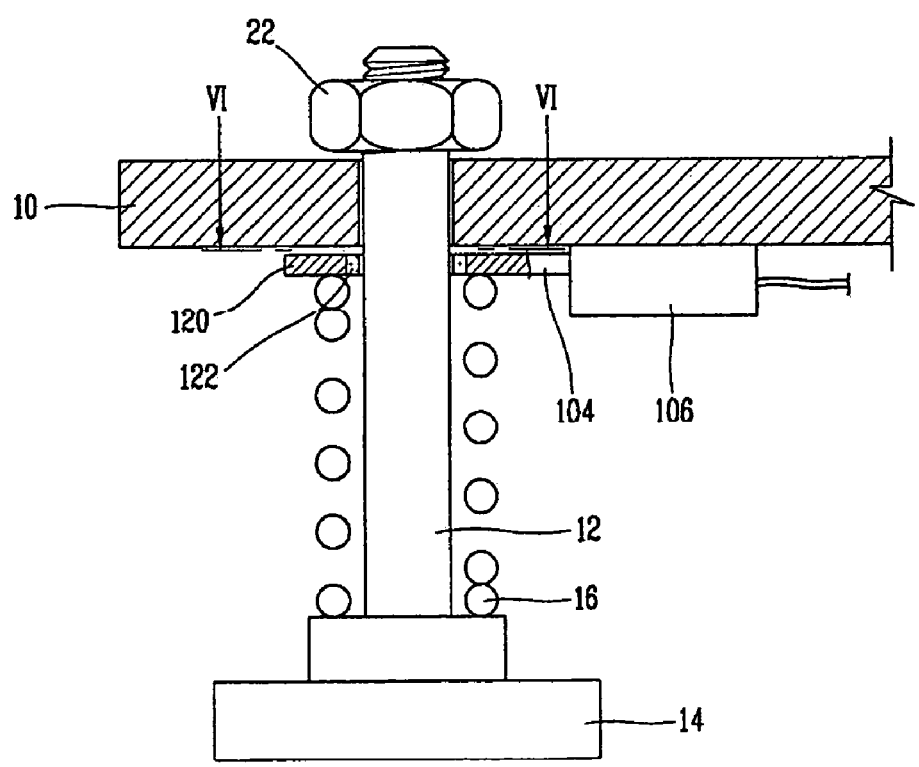
FIG. 21 is a cross-sectional view illustrating a supporting apparatus for a washing machine in accordance with a ninth embodiment of the present invention.
Figure 22:
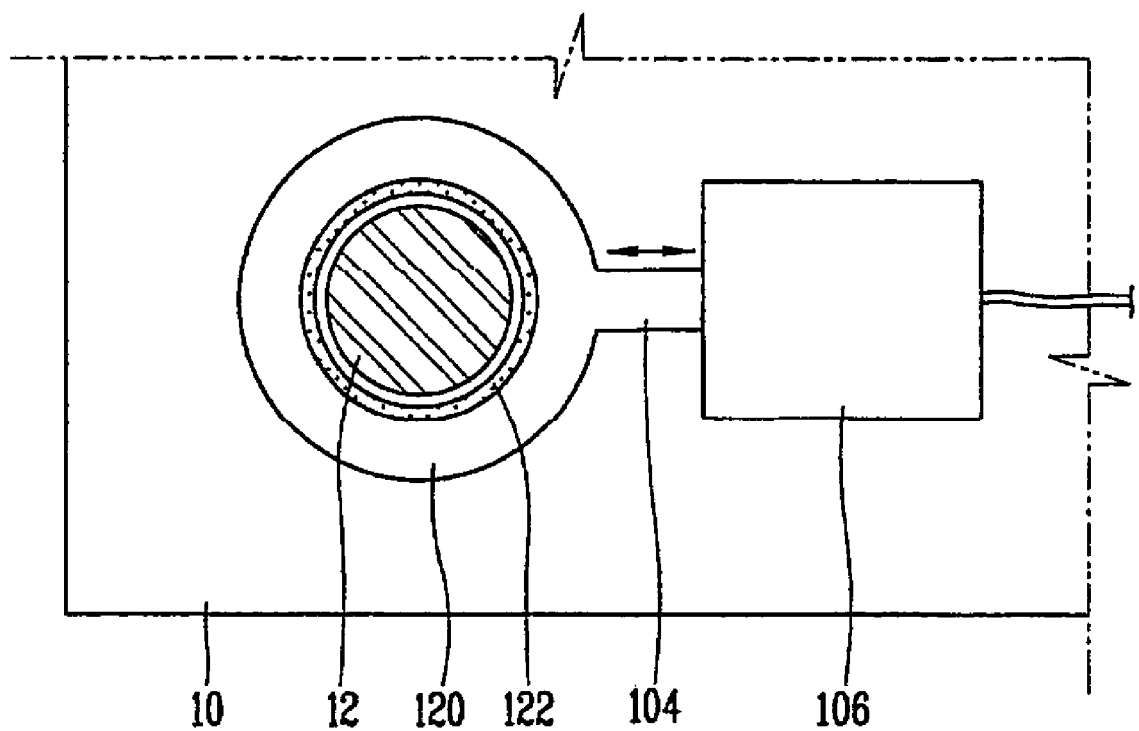
FIG. 22 is a cross-sectional view taken along line VI-VI of FIG. 21.

FIG. 21 is a cross-sectional view illustrating a supporting apparatus for a washing machine in accordance with a ninth embodiment of the present invention, and FIG. 22 is a cross-sectional view taken along line VI-VI of FIG. 21.

The supporting apparatus of the ninth embodiment is identical in structure to the supporting apparatus of the eighth embodiment except for the locking unit.

In accordance with the ninth embodiment of the present invention, a locking unit includes a push rod 104 provided to move linearly in a direction perpendicular to the supporting leg 12, a ring 120 incorporated with the end of the push rod 104, and provided separately from the outer circumferential surface of the supporting leg 12, a friction member 122 mounted on the inner circumferential surface of the ring 120, for rubbing against the outer circumferential surface of the supporting leg 12, and an actuator 106 on which the push rod 104 is mounted to move linearly, the actuator 106 linearly moving the push rod 104 when receiving power.

When the actuator 106 is driven by the operation of the washing machine, the push rod 104 linearly moves to move linearly the ring 120. Therefore, the friction member 122 mounted on the inner circumferential surface of the ring 120 rubs against the outer circumferential surface of the supporting leg 12, thereby locking movement of the supporting leg 12.

As discussed earlier, in accordance with the present invention, when the user puts the washing machine on the support surface, the level of the washing machine is automatically controlled by the elastic force of the springs. Thus, a height control operation is not necessary in the installation process of the washing machine.

In addition, even if the support surface is uneven, the feet of the supporting apparatuses always contact the support surface by the elastic force of the springs, to reduce noises and vibrations during the operation of the washing machine.

Furthermore, the supporting apparatus includes the damping unit, thereby reducing noises and vibrations during the operation of the washing machine.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

Although the invention has been described with reference to an exemplary embodiment, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed. Rather, the invention extends to all functionally equivalent structures, methods, and uses such as are within the scope of the appended claims.

What is claimed is:

1. A supporting apparatus for a washing machine, comprising:

a plurality of supporting legs mounted on a base fixed to a lower portion of a washing machine main body, at least one of said supporting legs being vertically movable;

a foot mounted on a lower end of said vertically movable supporting leg to contact a support surface;

a spring that applies an elastic force to said foot; and a damping unit that prevents horizontal motion of said vertically movable supporting leg;

said damping unit comprising:

a housing fastened to a top surface of said base, said housing having an inside space;

a first sheet member provided in said housing and fastened to said vertically movable supporting leg to move with said supporting leg in the vertical direction, to support an end of said spring;

a second sheet member provided at an upper inside portion of said housing, to support an end of said spring; and a friction member fixed to an outer circumferential surface of said first sheet member, to rub against an inner circumferential surface of said housing.

2. The supporting apparatus of claim 1, further comprising a buffer member to absorb shocks, said buffer member provided between an inside portion of said housing and said second sheet member.

3. The supporting apparatus of claim 1, wherein an inner circumferential surface of said friction member is fixed to said outer circumferential surface of said first sheet member, and an outer circumferential surface of said friction member rubs against said inner circumferential surface of said housing.

* * * * *